Dec. 28, 1948.    G. F. CARPENTER    2,457,208
TRACTION DEVICE FOR VEHICLE WHEELS
Filed Dec. 4, 1947    2 Sheets-Sheet 1

INVENTOR
Glen F. Carpenter
By Rudolph L. Lowell
Atty.

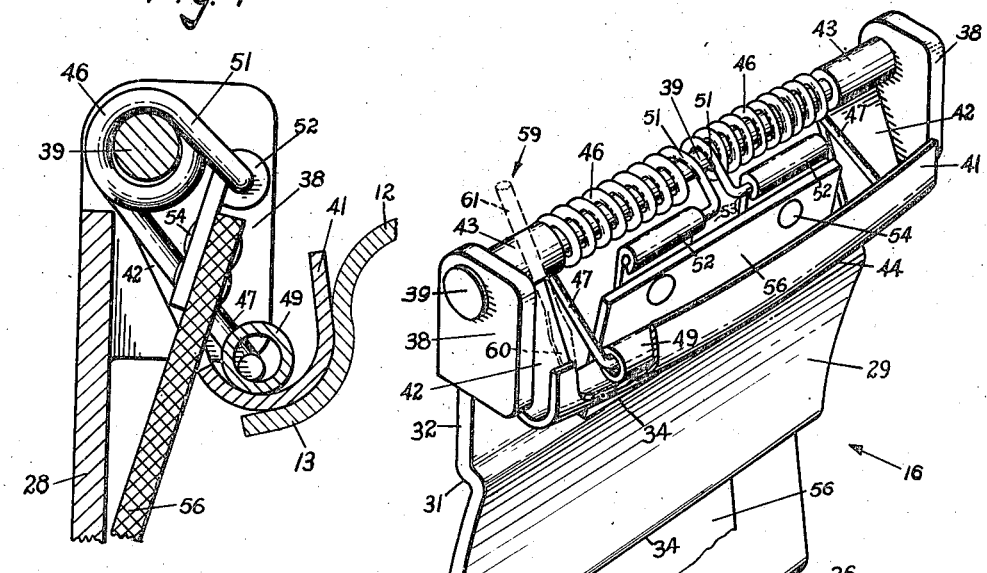
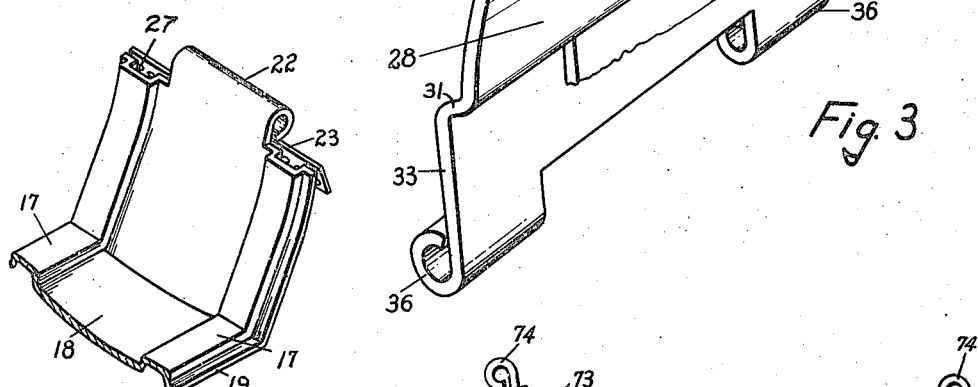
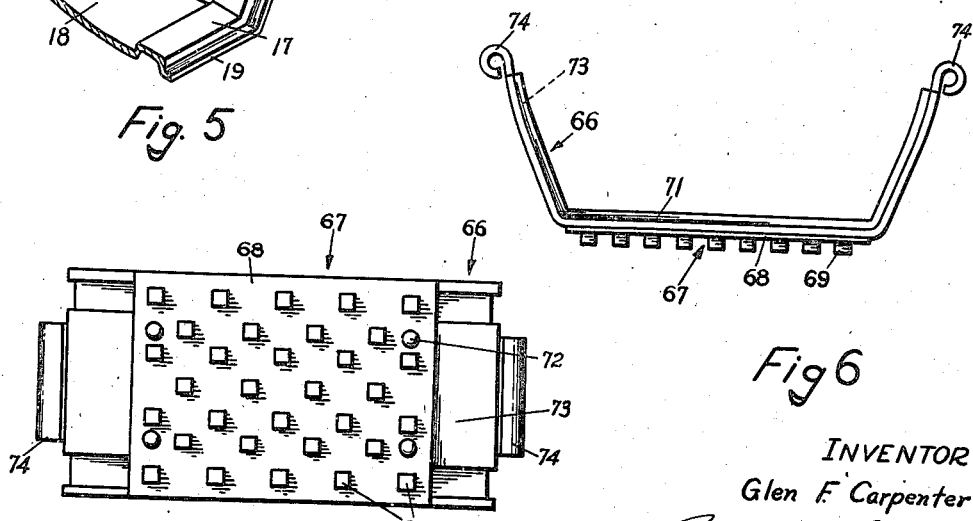
INVENTOR
Glen F. Carpenter

Patented Dec. 28, 1948

2,457,208

UNITED STATES PATENT OFFICE 2,457,208

TRACTION DEVICE FOR VEHICLE WHEELS

Glen F. Carpenter, Des Moines, Iowa

Application December 4, 1947, Serial No. 789,703

5 Claims. (Cl. 152—223)

1

This invention relates generally to traction devices for vehicle wheels having a rim and a tire, and in particular to a traction device of the type in which a plurality of the devices are carried in a spaced relation about a wheel.

Although traction devices of this type are generally satisfactory in operation, they are usually objectionable in that appreciable difficulty and inconvenience is encountered in their assembly with and removal from a tire. Further, many of these traction devices now commercially available are without the provision of any means adapted to maintain the device firmly positioned or gripped around the tire under varying road and load conditions.

It is an object of this invention, therefore, to provide an improved traction device for a vehicle wheel.

A further object of this invention is to provide a traction device capable of snugly gripping the tire under substantially all traveling conditions.

Yet another object of this invention is to provide a traction device which is automatically assembled with a wheel by being placed on the ground in a wheel receiving position, and then driving the wheel therein.

A feature of this invention is found in the provision of a traction device having an articulated frame structure comprised of a traction member pivotally connected with a pair of side units which are positionable at opposite sides of the tire and terminate inwardly of the vehicle rim. A flexible band, extended about the tire and arranged within the frame structure, has its opposite ends connected with spring means carried at the free inner ends of the side units. The spring means are arranged relative to movable rim engaging members, also carried at the free inner ends of the side units, such that the movable members are in rim-engaging positions when the flexible band is extended about the tire, and the pressure of the springs to hold the movable members in rim-engaging positions is increased in response to an outward flexing movement of the band.

Further objects, features and advantages of this invention will become apparent from the following description when taken in connection with the accompanying drawings, in which:

Fig. 1 is a fragmentary side elevational view

2 of a vehicle wheel showing the traction device of this invention in assembly relation therewith;

Fig. 3 is an enlarged perspective view of a rim supported side unit forming part of the device of this invention;

Fig. 4 is an enlarged fragmentary sectional view as seen on the line 4—4 in Fig. 1;

Fig. 5 is a fragmentary perspective view of a traction member forming part of the device of this invention;

Fig. 6 is a side elevational view of a modified form of traction member for the traction device; and Fig. 7 is a bottom view of the traction member shown in Fig. 6.

Figure 1:
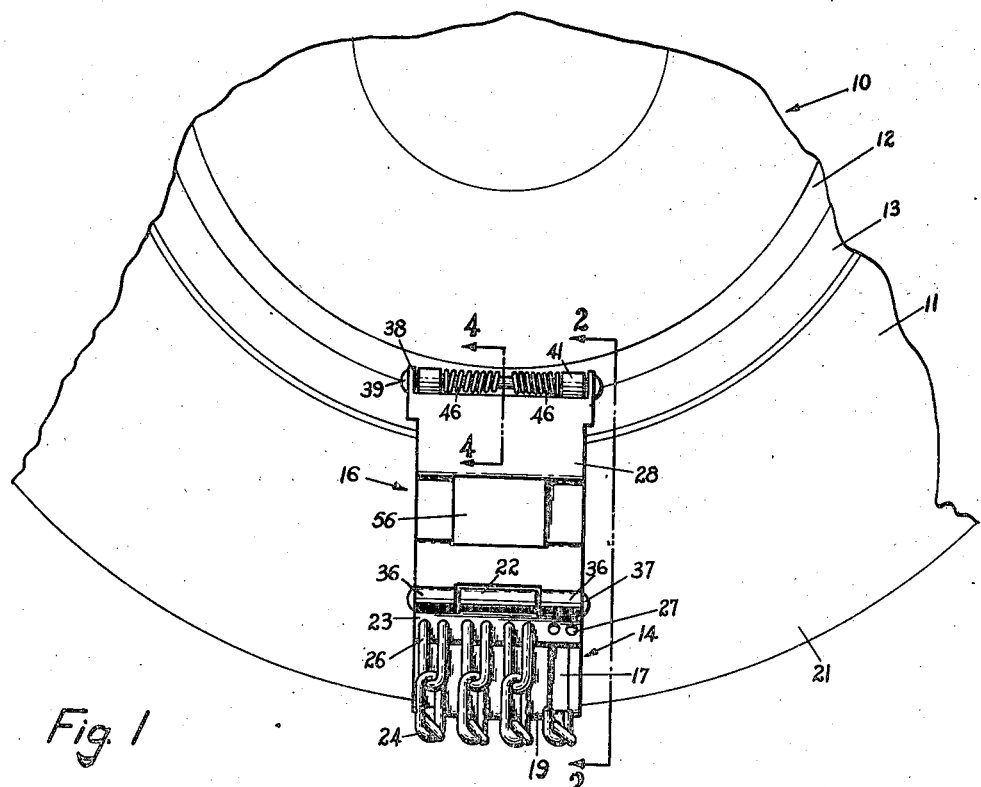
Figure 2:
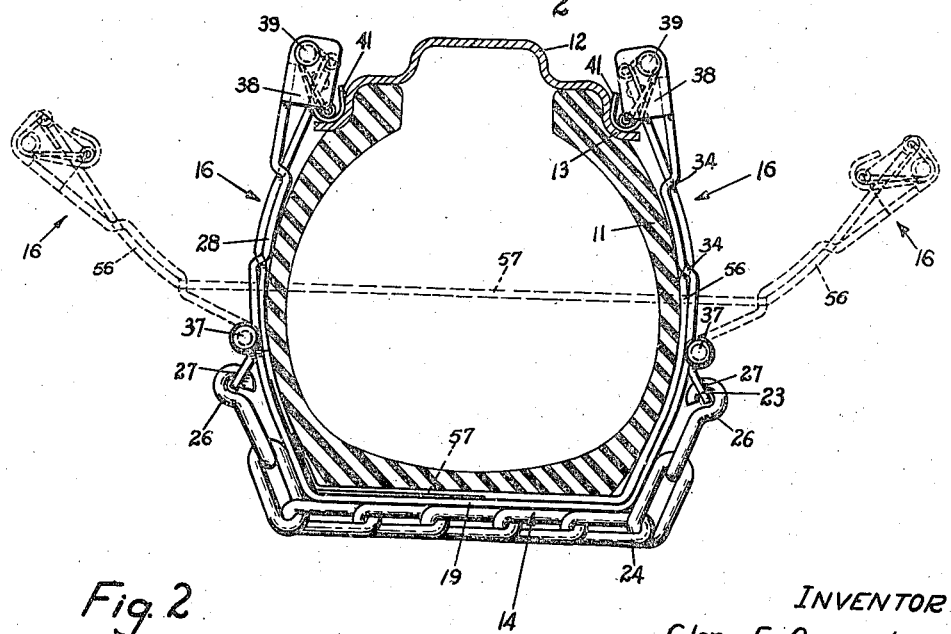
Fig. 2 is an enlarged sectional view taken on the line 2—2 in Fig. 1.

With reference to the drawings, the traction device of this invention is illustrated in Figs. 1 and 2 in assembly relation with a usual vehicle wheel 10 having a tire 11 and a rim 12 of drop center type. As is common in rims of this type, the rim side portions 13 are concavely curved so as to form peripherally extended side pockets at opposite sides of the rim.

The traction device includes an articulated frame structure having a substantially U-shape traction member 14 and a pair of side units 16. The traction member 14 (Figs. 1, 2 and 5) is constructed from a single piece of a flat plate material and has a pair of longitudinally extended transversely spaced projections or ribs 17 on its inner side which form a central guideway 18 for a purpose to appear later. The base section 19, of the traction member, is curved outwardly in a direction transversely of the traction member, as best appears in Fig. 1, with a radius corresponding to the outside curvature 21 of the tire 11.

The opposite ends of the traction member 14 are formed with centrally spaced single loops 22, which terminate in lateral projections 23. A series of chains 24 extended about the outside of the traction member 14, are provided with hooks 26 at their opposite ends adapted to be inserted within corresponding openings 27 formed in the projections 23.

Since the side units 16 are of a like construction, only one thereof will be described in detail. A side unit is comprised of a substantially flat body member 28 (Fig. 3) of a generally rectangular shape having a depressed transversely extended center section 29. The side walls 31 of the center section 29, which define the junctions of the center section with the inner end section 32 and the outer end section 33 of the body member, are formed with oppositely arranged elongated openings 34. The terms "inner" and "outer," as used in this description, will have reference to the vehicle wheel in directions radially thereof, and the term "laterally" will refer to a direction transversely of the vehicle wheel.

Formed at the outer end of the body member 28 are a pair of transversely spaced loops 36 (Figs. 1 and 3) adapted to receive a loop 22 on the traction member therebetween. A pin or pivot member 37 extended through the aligned loops 22 and 36 pivotally connects the side unit 16 with the traction member for pivotal movement laterally of the wheel 10, namely, toward and away from a side of the tire 11.

The inner end of the body member 28 (Fig. 3) is provided with a pair of transversely spaced lugs or ears 38 which extend laterally therefrom toward the vehicle wheel. It is contemplated that the body member 28 be of a length such that when it is in a pivotally moved position adjacent to a side of the tire 11, a portion of the ears 38 will extend inwardly of the rim sides 13, or above such rim sides as viewed in Fig. 2.

Carried between the ears 38 (Fig. 3) is a transverse pivot pin 39 for pivotally supporting a substantially U-shape arm or yoke 41. The ends of the legs 42 of the arm 41 are formed with loops 43 to receive the pin 39. The base 44 of the yoke 41 is of a curved contour in a direction transversely thereof, corresponding to the lateral curvature of the rim portion 13 and of a curvature in a direction longitudinally thereof corresponding to the peripheral curvature of a rim side portion 13. As clearly appears in Figs. 2 and 3, the U-shape arm 41 projects outwardly from its pivot 39 toward the vehicle wheel 10.

A pair of torsion springs 46 (Fig. 3) are mounted adjacent to each other on the pivot pin 39, between the bearings or loops 43 for the U-shape arm 41. The spring ends 47, next to the bearings 43, are inserted within the opposite ends of a tube member 49 welded or otherwise secured, within the curved base 44 of the U-shape arm 41. The inner adjacent ends 51 of the torsion springs 46 are supported in clip members 52 which extend within the opening or space 53, defined by the pivot pin 39, and the legs 42 and base 44 of the U-shape arm 41.

The clips 52 are secured as by rivets or the like 54 to the opposite ends of a flexible band 56 (Figs. 2 and 4) which is arranged about the tire 11 and within the articulated frame structure of the device. The intermediate section 57 of the band 56 is positionable within the guideway 18 of the traction member 14. From the traction member, each end section of the band extends under the outer end section 33 of a body member 28, through the aligned elongated openings 34 and across the body member center section 29, and then below the top section 32 for connection with a clip 52. It is seen, therefore, that the band is loosely positioned within the openings 34 so as to be movable longitudinally relative to the body members 28.

The arrangement of the spring ends 51 relative to the pivot 39, and their connection with the clips 52 at positions between the pivot 39 and the base 44 of the arm 41, provides for an increased spring pressure on the arms 41 in response to an increase in the outward pull on the side lengths of the flexible band 56. It is seen, therefore, that the arms 39 are pivotally movable in response to the tension pressure in the band for a purpose to be later explained.

In use, the traction device of this invention is automatically assembled with the vehicle wheel 10 by positioning the traction member 14 in line with the wheel and permitting the side units 16 to hang therefrom, as shown in dotted lines in Fig. 2. With the side units 16 thus positioned, the intermediate section 57 of the flexible band 56 extends longitudinally of the traction member 14, in a substantially horizontal plane, and in a supported position on the body members 28 at the outer openings 34 therein. Since the band 56 is thus without any substantial tension pressure or pull the arms 41 are pivoted, in response to the action of the springs 46, in a direction inwardly of the wheel from their full line positions in Fig. 2, to their dotted line positions shown in the same figure.

When the wheel 10 is advanced within the traction member 14, namely, between the legs of the traction member, the intermediate band section 57 is engaged by the tire 11 and is moved toward the base 19 and within the guideway 18. Concurrently with this movement of the band, the side units 16 are moved laterally inwardly toward the tire 11, and the arms 41 are pivotally moved toward their full line positions shown in Fig. 2, by the action of the springs 46. The lengths of the band 56 and of the legs 42 of the pivoted arms 41 are such that when the side units 16 are moved to their full line positions shown in Fig. 2, the base sections 44 of the arms 41 are moved and then yieldably held in releasable engagement with the rim side portions 13.

From a consideration of Fig. 2, it is seen that when the tire 11 is flexed in a laterally outward direction, the side units 16 are pivoted laterally away from the tire to in turn provide for a laterally outward flexing movement of the band 56. The resultant downward movement of an end of the band 56, as viewed in Fig. 4, results in a downward pull on the spring ends 51 and an upward movement toward the right of the pivot 39 whereby the arm 41 is more firmly engaged with the rim side portion 13.

The arms 41 are thus pivotally moved by the springs 46 in response to a flexing movement of the band 56, with this pivotal movement being permitted by virtue of the rocking action of the arms within the rim portions 13. It is seen, therefore, that the side units 16 are movable relative to the rim 12, in response to a flexing movement of the tire 11, and that the action of the band 56 and spring pressed arms 41 maintains the side units 16 and traction member 14 firmly against the tire at all times. It will be further observed that the band 56 is movable relative to the tire 11 by virtue of its position in the guideway 18 of the traction member 14, and its insertion through the openings 34 in the side unit body members 28.

To remove the traction device from the wheel, a screw driver or the like, indicated at 59 in Fig. 3, has its working end 60 inserted with the concavity of the arm base member 44 so that its shank 61 is fulcrumed on one of the bearings 43. By pressing downwardly on the screw driver handle (not shown) the arm 41 is pivotally moved out of engagement with a rim portion 13. The band 56 is thus relieved of any tension pressure so that the side units 16 are permitted to fall laterally outwardly away from the tire 11.

In Figs. 6 and 7 there is shown a modified form of traction member 66 which is substantially similar to the traction member 14, except for the substitution of a detachable ground-engaging member 67 for the series of chains 24. The member 67 is integrally formed with a base 68 having projecting studs 69 of a substantially square shape, arranged in a staggered relation on its outer side. The base 68 is secured to the base 71 of the traction member 66 by rivets or the like 72.

The studs 69 act to reduce sidewise skidding, as well as longitudinal skidding of the tire; when the studs 69 become worn the complete member 67 is readily replaceable. The traction member 66 is formed with a central guideway 73 adapted to receive the flexible band 56, and with loops 74 adapted for pivotal connection with the loops 36 on the side units 16, in all respects similar to the assembly of the side units with the traction member 14.

From a consideration of the above description it is seen that the invention provides a traction device for a vehicle wheel which is of a rugged and compact construction, and comprised of an articulated frame structure adapted to extend about the wheel tire. The device is capable of being automatically assembled on the vehicle wheel, by merely driving the wheel therein, and includes means providing for the frame structure being firmly gripped or held closely adjacent to the wheel tire under all traveling conditions. The traction device is readily removed from the vehicle wheel so that its assembly with and removal from the wheel is accomplished with a minimum of effort and time.

Although the invention has been described with respect to a preferred embodiment thereof, it is to be understood that it is not to be so limited since changes can be made therein which are within the full intended scope of this invention as defined by the appended claims.

I claim:

1. A traction device for a vehicle wheel having a tire and a rim comprising, a flexible band member positioned about said tire with its ends arranged at opposite sides of said rim, a traction member of a substantially U-shaped positioned about a ground-engaging portion of said tire and over the intermediate portion of said flexible band, a pair of oppositely arranged rim supported units including substantially flat body members arranged at opposite sides of the tire, means connecting said band with said body members for movement relative thereto, means pivotally connecting said body members with the opposite ends of said traction members for pivotal movement toward and away from the tire, arm members pivotally supported on said body members for pivotal movement laterally of the tire, said arms being inclined relative to said body members such that their free ends are engageable with opposite side portions of said rim, and spring means on said units arranged relative to said arms and connected with the opposite ends of said band to releasably hold said arms in engagement with said rim side portions and to provide for a movement of said units relative to the rim in response to a flexing movement of said band.

2. A traction device for a vehicle wheel having a tire and a rim comprising, a flexible band member positioned about said tire with the ends thereof arranged at opposite sides of said rim, a traction member arranged about the intermediate section of said band, a pair of rim-supported units arranged at opposite sides of the tire having the lower portions thereof pivotally connected with the opposite ends of said traction member, pivoted arms on said units having their free ends rockably supported in releasable engagement with said rim, spring means for yieldably holding said arms in engagement with said rim, and means for connecting said spring means with the ends of said band member such that said pivoted arms are rockable on said rim in response to a flexing movement of said band.

3. A traction device for a vehicle wheel having a tire and a rim comprising, a flexible band member positionable about said tire with its ends at opposite sides of said rim, a traction member arranged about the intermediate portion of said band having end portions positioned along the sides of said tire, a pair of rim-supported units including substantially flat body members pivotally arranged at opposite sides of said tire and connected with said end portions, with said body members being extended inwardly of the wheel to positions opposite the sides of said rim, pivoted members at the inner ends of said body members having their free ends rockably supported in releasable engagement with said rim, spring means for releasably holding said pivoted members in rockable engagement with said rim, means connecting said band member for longitudinal movement relative to said body members, and means connecting said spring means with the ends of said band to provide for a rockable movement of said pivoted members relative to said rim in response to a flexing movement of said band.

4. A traction device for a vehicle wheel having a rim and a tire comprising, a traction member of a substantially U-shape positionable about a ground-engaging portion of said tire with its end portions extended inwardly along the sides of the tire, a flexible band extended about the tire between said traction member and tire, having its ends positionable at opposite sides of said rim, rim supported units arranged at opposite sides of the tire including pivoted arms the free ends of which are adapted to be supported in releasable engagement with opposite side portions of said rim, means pivotally connecting said units with the ends of said traction member for pivotal movement toward and away from said tire, and spring means connected between said pivoted arms and the ends of said band such that said arms are in releasable engagement with said rim portions when the band is arranged about the tire, with intermediate portion of said band being positioned in a substantially horizontal plane when said rim units are in pivotally moved positions away from the tire whereby on movement of the wheel within the device said intermediate band portion is engaged by the tire and moved within said traction member to provide for an inward pivotal movement of said units to positions at which said rim is releasably engaged by said pivoted arms.

5. A traction device for a vehicle wheel having a tire and a rim comprising, a flexible band member positioned about said tire with its ends at opposite sides of said rim, an articulated frame structure arranged about said band member including a traction member and a pair of side members arranged at opposite sides of the tire, means pivotally connecting said side members with said traction member for pivotal movement transversely of the tire, pivotal means on said side members adapted to have their free ends yieldably held in a rockable releasable engagement with opposite side portions of said rim, and spring means on said side members connected between said pivoted means and the ends of said band member to yieldably hold said pivoted means in rim-engaging positions and to provide for a rockable movement of said pivoted means in response to a flexing movement of said band member whereby to maintain said frame structure against said tire.

GLEN F. CARPENTER.

REFERENCES CITED

The following references are of record in the file of this patent:

UNITED STATES PATENTS

| Number | Name | Date |
|---|---|---|
| 1,540,067 | Grimord | June 2, 1925 |
| 2,440,863 | Liggio | May 4, 1948 |